United States Patent
Parzyck et al.

(10) Patent No.: US 10,414,369 B2
(45) Date of Patent: Sep. 17, 2019

(54) HEADACHE RACK

(71) Applicant: Curt Manufacturing, LLC, Eau Claire, WI (US)

(72) Inventors: Wolfe C. Parzyck, Colfax, WI (US); Robert G. Fehr, Colfax, WI (US); Joel D. Diller, Eau Claire, WI (US); Brennan Druckrey, Eau Claire, WI (US)

(73) Assignee: Curt Manufacturing, LLC, Eau Claire, WI (US)

(*) Notice: Subject to any disclaimer, the term of this patent is extended or adjusted under 35 U.S.C. 154(b) by 83 days.

(21) Appl. No.: 15/680,152

(22) Filed: Aug. 17, 2017

(65) Prior Publication Data

US 2018/0118148 A1    May 3, 2018

Related U.S. Application Data

(60) Provisional application No. 62/414,553, filed on Oct. 28, 2016.

(51) Int. Cl.
*B60R 21/02* (2006.01)
*B62D 33/02* (2006.01)

(52) U.S. Cl.
CPC ............ *B60R 21/02* (2013.01); *B60R 21/026* (2013.01); *B62D 33/0207* (2013.01)

(58) Field of Classification Search
CPC . B60R 21/02; B60R 2021/0083; B60R 9/048; B60R 21/026; B60R 13/04; B62D 33/0207

USPC .............................. 280/748, 756, 762; 296/3
See application file for complete search history.

(56) References Cited

U.S. PATENT DOCUMENTS

| | | | | |
|---|---|---|---|---|
| 3,032,351 A | * | 5/1962 | Lewis, Jr. .................. | B60J 1/20 280/748 |
| 3,049,363 A | * | 8/1962 | Marx ...................... | B60R 21/00 280/748 |
| 3,765,713 A | * | 10/1973 | Suitt ........................ | B60R 9/00 224/309 |
| 3,861,736 A | * | 1/1975 | Rossler .................... | B60P 7/16 280/770 |
| 3,907,057 A | * | 9/1975 | Reddekopp ............ | B60K 13/04 180/89.2 |
| 4,564,216 A | * | 1/1986 | Kinyon ................... | B60R 11/00 280/32.6 |
| 4,611,824 A | * | 9/1986 | McIntosh ................ | B60R 21/00 280/748 |
| 4,708,384 A | * | 11/1987 | LaRosa ................... | B60R 21/12 296/24.46 |

(Continued)

*Primary Examiner* — Paul N Dickson
*Assistant Examiner* — Hilary L Johns
(74) *Attorney, Agent, or Firm* — Shewchuk IP Services, LLC; Jeffrey D. Shewchuk

(57) ABSTRACT

A headache rack is formed substantially from sheet metal, including left and right uprights as part of a framing portion supporting a screen. The forward edge of the uprights has a concave curvature facing the cab and providing a cantilever, and a folded rearward edge causing the uprights to be considerably wider where they contact the pickup truck bed walls than they are at their tops. The framing portion is provided in three separable sections, connectable by the user using fasteners such as nuts and bolts, with a removable screen in the center frame portion.

17 Claims, 7 Drawing Sheets

(56) References Cited

U.S. PATENT DOCUMENTS

| | | | | |
|---|---|---|---|---|
| 4,824,157 A * | 4/1989 | Nielsen | B60P 7/02 | 296/10 |
| 4,867,497 A * | 9/1989 | Jayne | B60P 7/0815 | 296/3 |
| 4,953,908 A * | 9/1990 | Dondlinger | B60J 1/2088 | 280/762 |
| 4,973,099 A * | 11/1990 | Deaver | B62D 33/02 | 296/99.1 |
| 5,035,458 A * | 7/1991 | Boensch | B60R 21/00 | 280/748 |
| 5,121,306 A * | 6/1992 | Palmisano | B60R 9/00 | 224/404 |
| D333,289 S * | 2/1993 | Shirlin | D12/403 | |
| 5,238,280 A * | 8/1993 | Christensen | B60R 9/00 | 296/3 |
| D381,306 S * | 7/1997 | Sauerwein | D12/190 | |
| 6,746,047 B2 * | 6/2004 | Hagen | B60R 21/02 | 280/748 |
| 6,983,968 B2 * | 1/2006 | Brauer | B62D 33/0207 | 224/405 |
| 7,036,866 B2 * | 5/2006 | Perakis | B60J 1/183 | 280/756 |
| 7,121,585 B2 * | 10/2006 | Cole | B60Q 1/2661 | 280/748 |
| 7,494,169 B2 * | 2/2009 | Collins | B60P 3/40 | 296/3 |
| 7,780,195 B2 * | 8/2010 | German | B60P 7/16 | 280/770 |
| 8,668,124 B2 | 3/2014 | Kennedy et al. | | |
| D731,399 S | 6/2015 | Bluhm | | |
| 9,132,784 B2 * | 9/2015 | Harrison | B60R 9/045 | |
| 9,637,178 B1 * | 5/2017 | Diller | B60R 3/002 | |
| 9,713,978 B2 | 7/2017 | Petru | | |
| 10,046,721 B2 * | 8/2018 | Wymore | B60R 13/04 | |
| 2003/0011180 A1 * | 1/2003 | Coffman | B60R 11/00 | 280/748 |
| 2007/0176447 A1 * | 8/2007 | Storer | B60R 13/00 | 296/3 |
| 2011/0108590 A1 * | 5/2011 | Kennedy | B60R 9/045 | 224/402 |
| 2015/0273987 A1 * | 10/2015 | O'Leary | B60J 1/2094 | 180/89.2 |

* cited by examiner

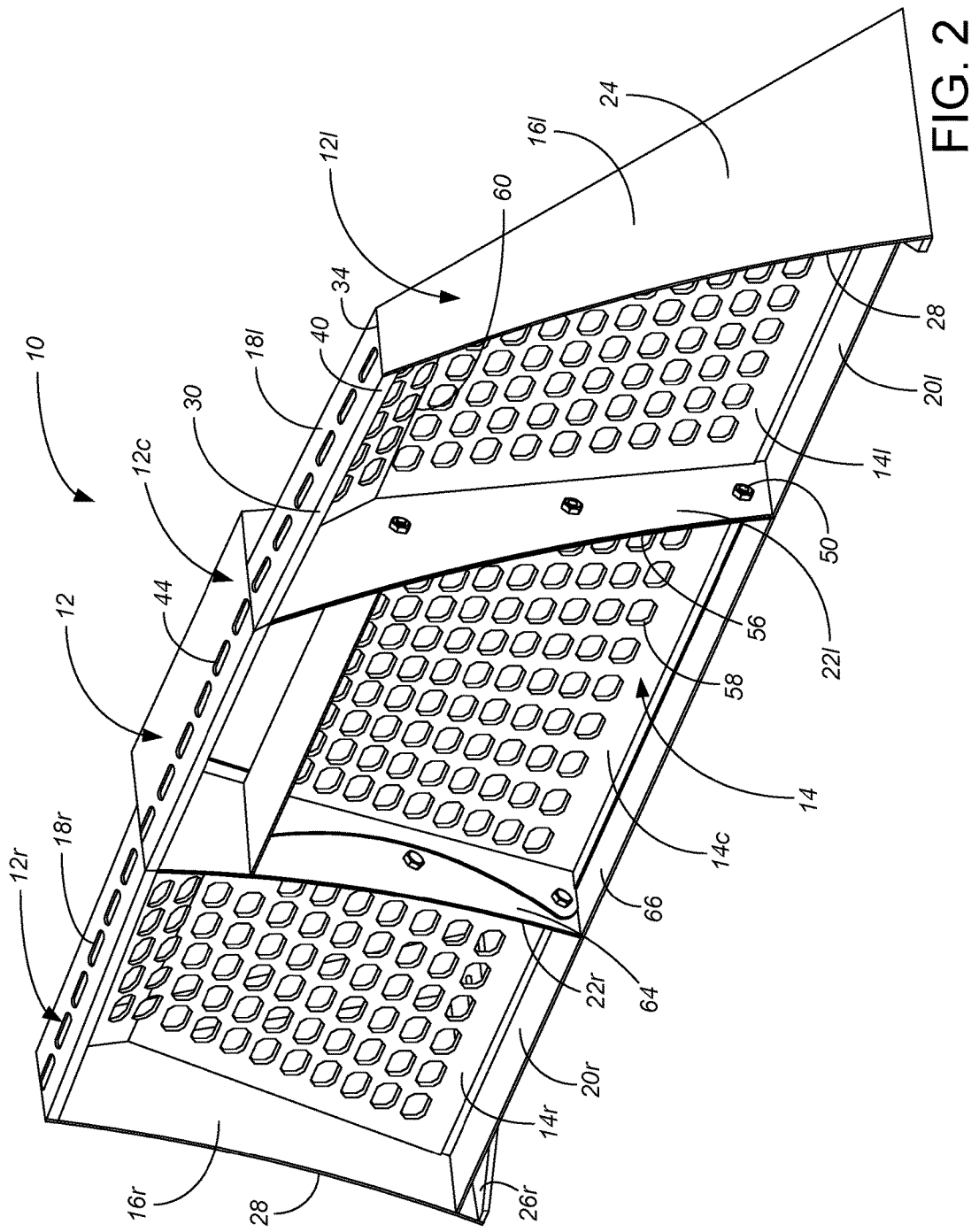

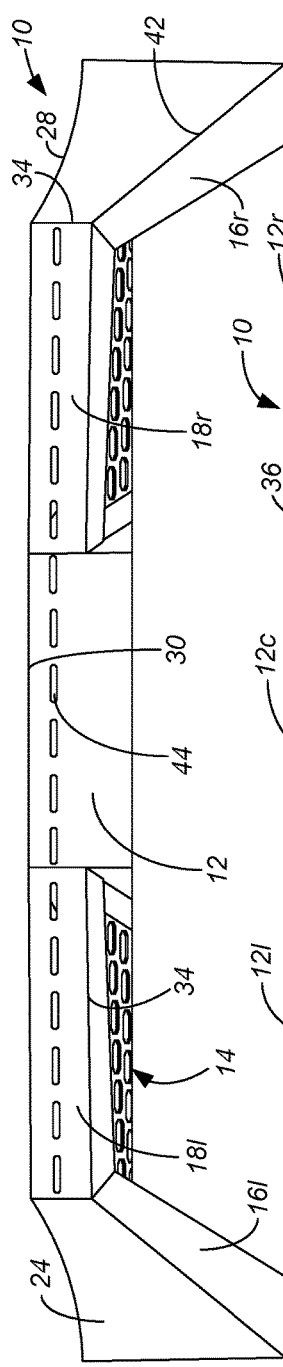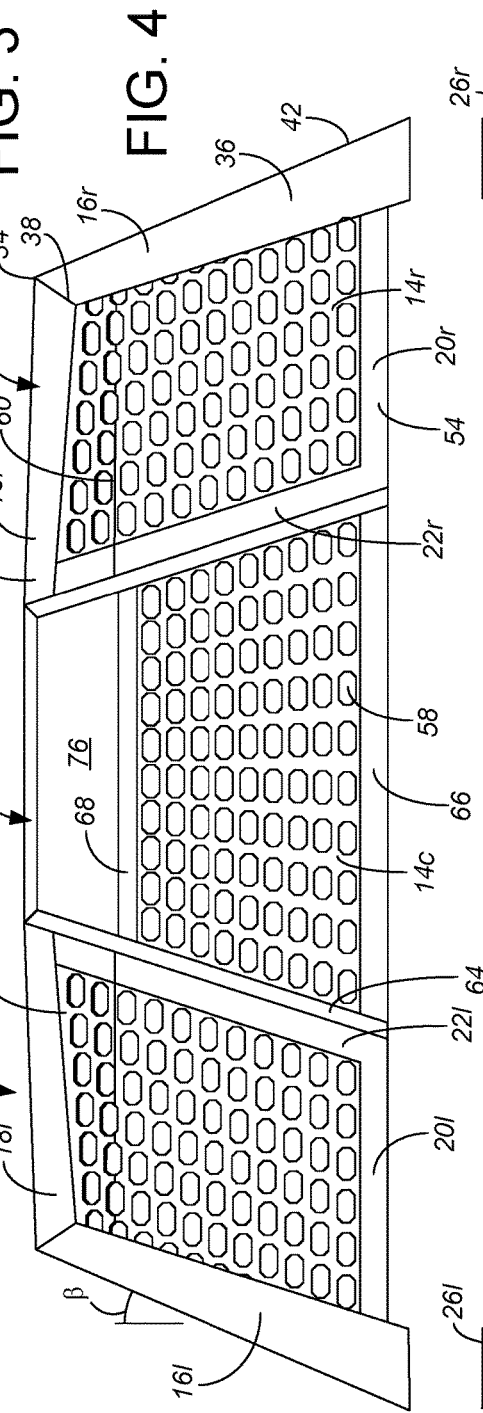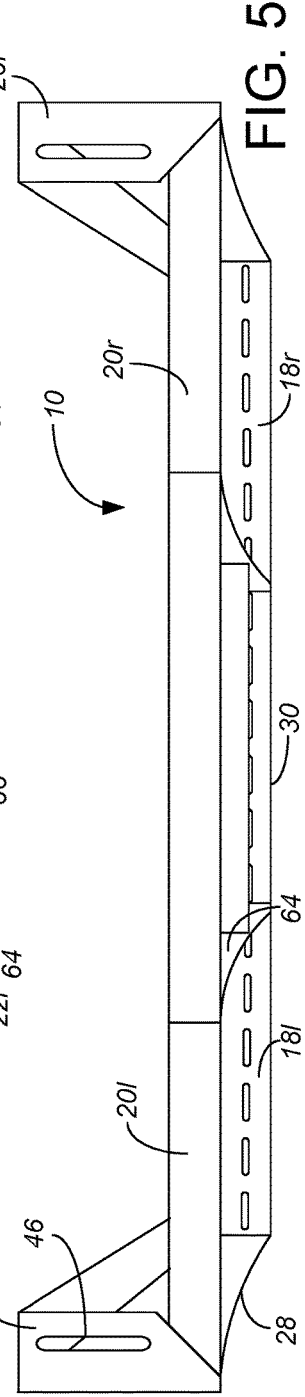

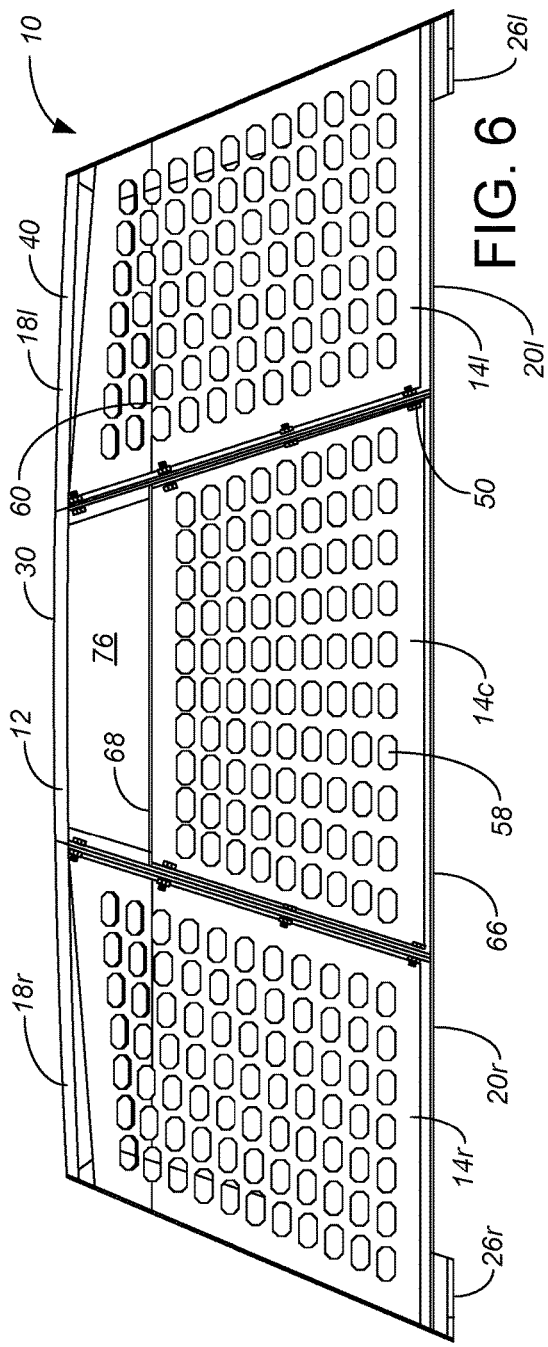
FIG. 6
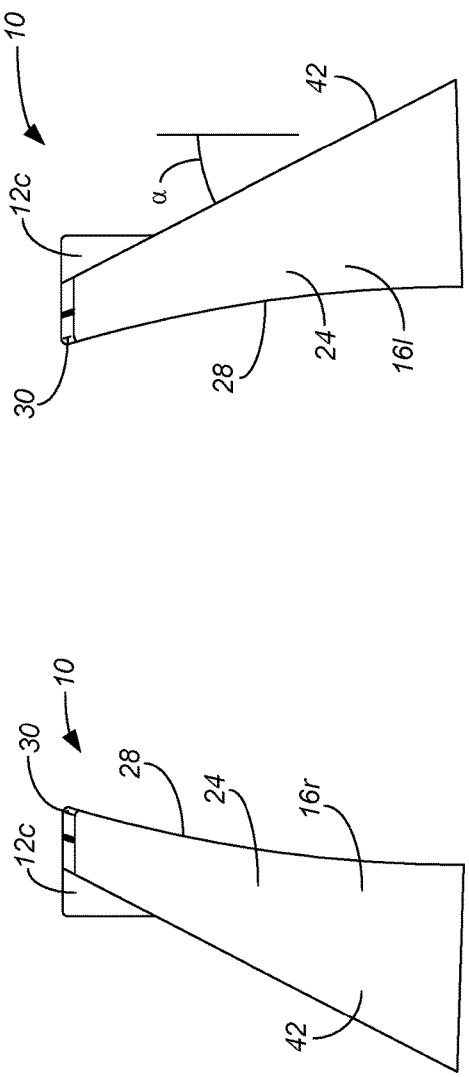
FIG. 8
FIG. 7

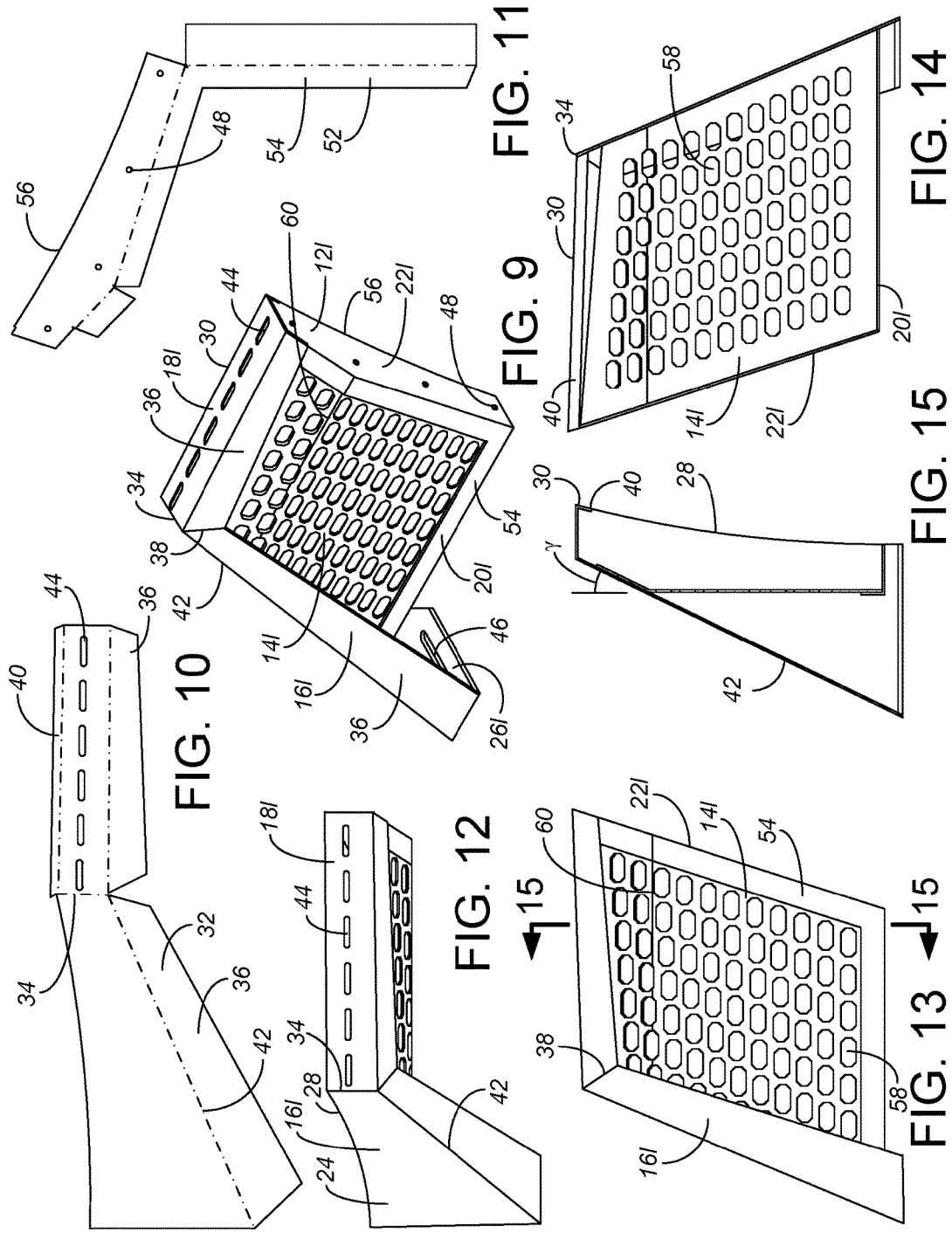

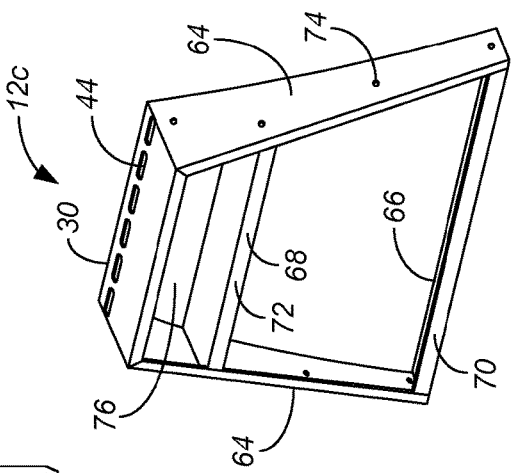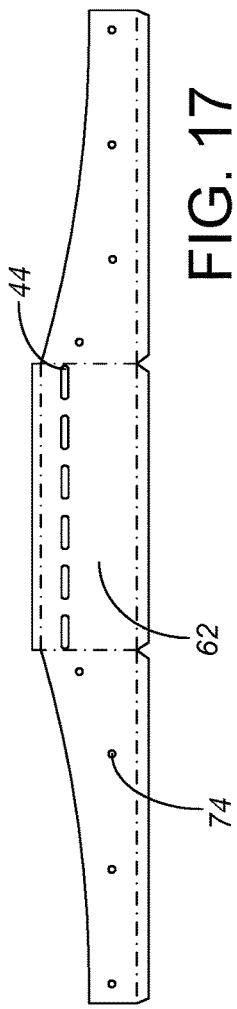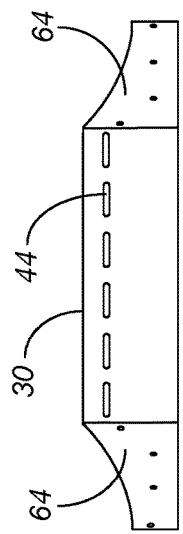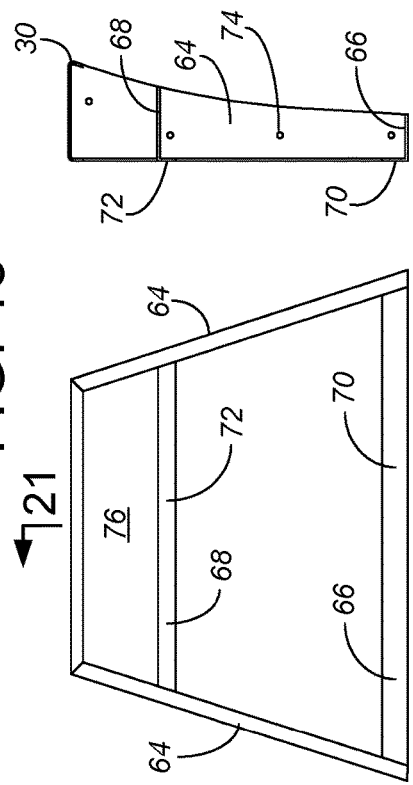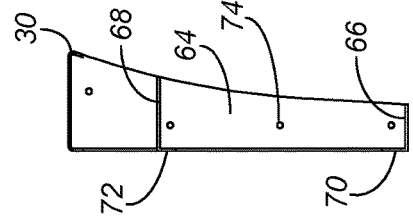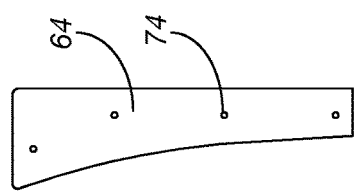

HEADACHE RACK

CROSS-REFERENCE TO RELATED APPLICATION(S)

The present application claims priority from U.S. Provisional Application No. 62/414,553 entitled VEHICLE AFTERMARKET ATTACHMENTS filed Oct. 28, 2016, incorporated herein by reference.

BACKGROUND OF THE INVENTION

Many different types of exterior accessory products are known for attachment to vehicles such as pickup trucks, sport utility vehicles ("SUVs"), crossover utility vehicles ("CUVs"), four-wheel drive vehicles ("4×4s"), jeeps, police cars, all-terrain and other utility vehicles. Such exterior accessories can be provided as part of a trim package offered by the original equipment manufacturer, but more commonly are provided in the automotive and trucking aftermarket. Many such exterior accessory products are formed primarily using tubular metal (such as steel or aluminum alloy) as the primary starting material, with the tubular metal being cut, bent and/or welded into the shape desired for the exterior accessory product. Standard tubular metal shapes include round, rectangular and oval in cross-section.

One type of exterior accessory known as a headache rack is attached behind the cab in vehicles such as pickup trucks. See U.S. Pat. Nos. 8,668,124 and 9,637,178, for example, incorporated by reference. In addition to being ornamental, such headache racks serve to protect the rear window of the cab, including protection from cargo while such cargo is being placed into the cab of the pickup truck and protection should the cargo shift forward during driving (and particularly stopping) of the vehicle. The headache rack must be shaped to adequately perform this protective role. Like other exterior accessories, many common designs of headache racks are primarily formed from tubes and longitudinal bars.

For attaching to the top of the walls defining the bed of the pickup truck, headache racks can have one or more tubes directly inserted into stake pockets, or can use stake pocket anchors such as disclosed in U.S. patent application Ser. No. 15/338,193, for example, incorporated by reference. Some headache racks also include screen portions attached to the tubes or longitudinal bars, which permit at least some viewing through the rear window of the cab and through the screen portion. The screen portion, if present, is typically formed of a sheet material, which could be sheet metal (to provide significant strength against cargo), or alternatively could be a lighter weight polymer or fabric sheet material.

Exterior accessory products such as headache racks are normally subjected to considerable amounts of dirt and grime, and are treated very roughly and must withstand considerable impacts and loads, and exterior accessory products should readily withstand such conditions. The headache rack must be robust and reliable, to last for carefree operation over the life of at least one vehicle despite being openly exposed to weather over its years or decades of use. As much as possible, the headache should also have minimal cost and expense in manufacturing and assembly. In keeping with these objectives, further improvements to headache are possible.

BRIEF SUMMARY OF THE INVENTION

The present invention is headache rack which includes left and right uprights as part of a framing portion supporting a screen. The uprights, and if desired all of the framing portion, are formed of sheet metal. In one aspect, forming the uprights of sheet metal allows them to have a forward edge with a concave curvature facing the cab. The concave curvature can be used to provide a cantilever directed toward the cab. In another aspect, the uprights are considerably wider where they contact the pickup truck bed walls than they are at their tops, providing a better force transfer to and from the sidewalls of the pickup truck bed to the uprights and making it less likely for damage or deformation to occur either to the headache rack or the pickup truck bed walls. In another aspect, the framing portion is provided in three separable sections, connectable by the user using fasteners such as nuts and bolts.

BRIEF DESCRIPTION OF THE DRAWINGS

FIG. 2 is a perspective view of the headache rack of FIG. 1, looking from the driver side front (when oriented as installed behind the rear window of a pickup truck near the front of the pick-up truck bed).

FIG. 3 is a top plan view of the headache rack of FIGS. 1 and 2.

FIG. 4 is a rear (exposed toward the truck bed) elevational view showing the headache rack of FIGS. 1-3.

FIG. 5 is a bottom plan view showing the headache rack of FIGS. 1-4.

FIG. 6 is a front (partially concealed toward the truck cab) elevational view showing the headache rack of FIGS. 1-5.

FIG. 7 is a right (passenger side) side view of the headache rack of FIGS. 1-6.

FIG. 8 is a left (driver side) side view of the headache rack of FIGS. 1-7.

FIG. 9 is a perspective view of the driver side portion of the headache rack of FIGS. 1-8, looking from the passenger side rear. The passenger side portion is a mirror image of the driver side portion.

FIG. 10 is a plan view of the blank used to form the driver side upright and top of the frame of the driver side portion of FIG. 9.

FIG. 11 is a plan view of the blank used to form the mid-upright and bottom of the frame of the driver side portion of FIG. 9.

FIG. 12 is a top plan view of the driver side portion of FIG. 9.

FIG. 13 is a rear elevational view of the driver side portion of FIGS. 9 and 12.

FIG. 14 is a front elevational view of the driver side portion of FIGS. 9, 12 and 13.

FIG. 15 is a cross-sectional view, taken along lines 15-15 in FIG. 13.

FIG. 16 is a perspective view of the center frame of the headache rack of FIGS. 1-8, looking from the passenger side rear, without the center screen installed.

FIG. 17 is a plan view of the blank used to form the uprights and top of the center frame of FIG. 16.

FIG. 18 is a top plan view of the center frame of FIG. 16.

FIG. 19 is a rear elevational view of the center frame of FIGS. 16 and 18.

FIG. 20 is a left (driver side) view of the center frame of FIGS. 16, 18 and 19.

FIG. 21 is a right (passenger side) view of the center frame of FIGS. 16 and 18-20.

Figure 1:
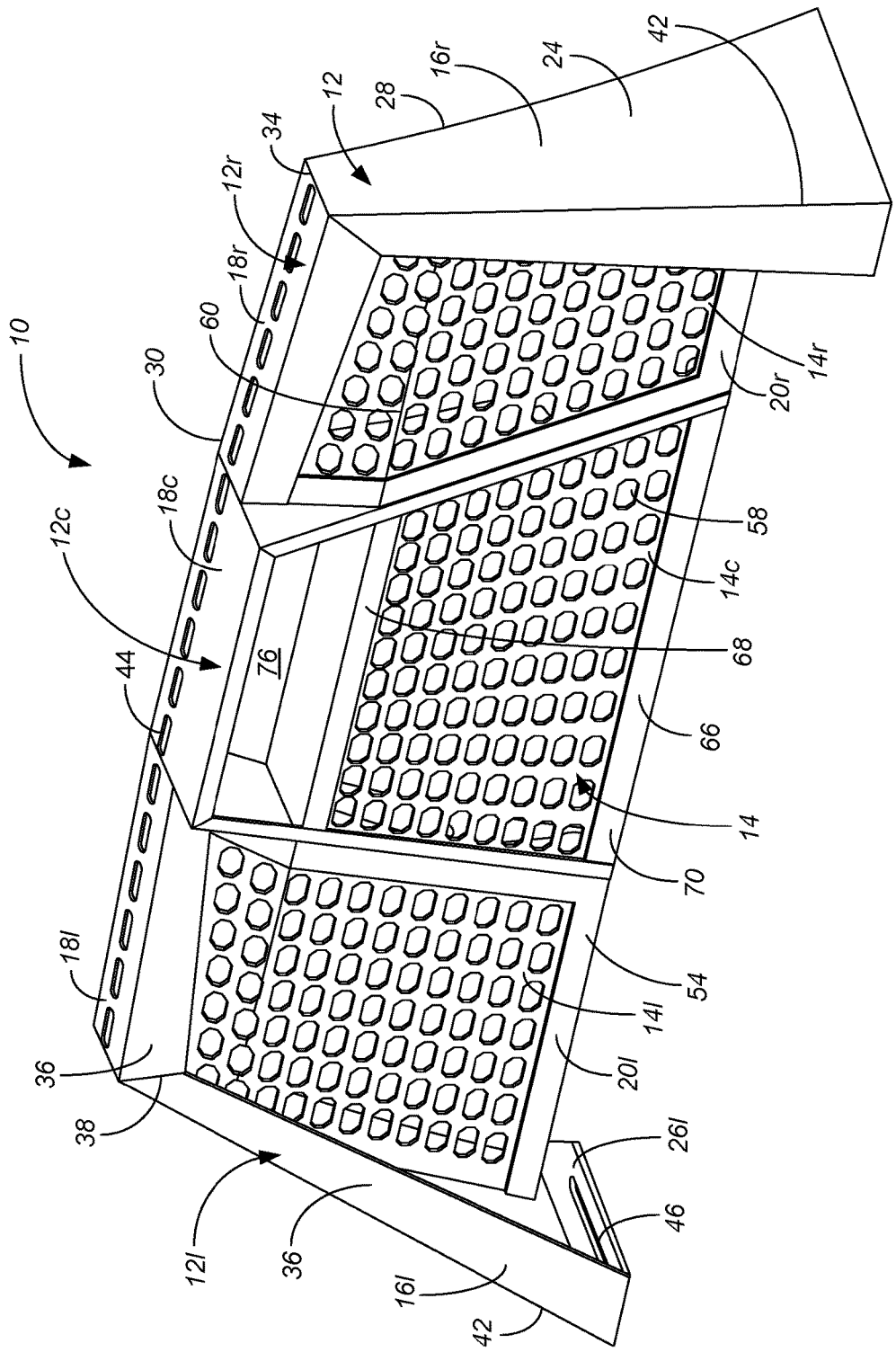
FIG. 1 is a perspective view of a preferred embodiment of a headache rack of the present invention, looking from the passenger side rear (when oriented as installed behind the rear window of a pickup truck near the front of the pick-up truck bed).
Figure 22:
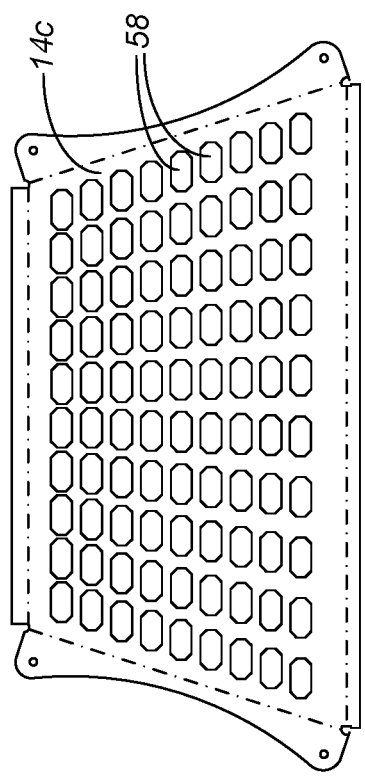
FIG. 22 is a plan view of the blank used to form the center screen of the headache rack of FIGS. 1-8.
Figure 23:
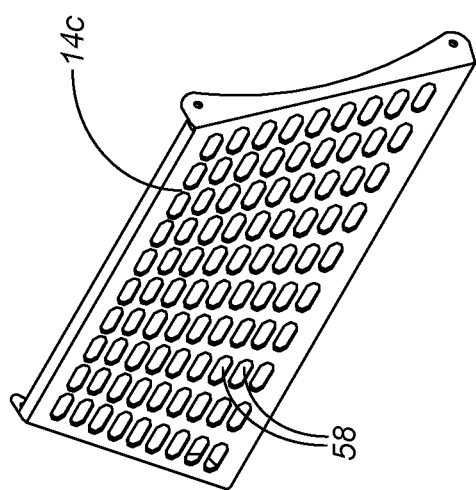
FIG. 23 is a perspective view of the center screen of the headache rack of FIGS. 1-8, looking from the passenger side rear.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The preferred headache rack 10 in accordance with the present invention includes a frame 12 and a screen 14. The frame 12 includes at least a left, or driver side, upright 16*l* and a right, or passenger side upright 16*r*. The screen 14 extends between the left upright 16*l* and the right upright 16*r*. In the preferred embodiment, the frame 12 is provided by three separate portions (a left frame 12*l*, a center frame 12*c* and a right frame 12*r*), with the screen 14 similarly provided by three separate portions (a left screen 14*l*, a center screen 14*c* and a right screen 14*r*) each fitting within its corresponding frame 12*l*, 12*c*, 12*r*. In addition to the left upright 16*l*, the left frame 12*l* preferably includes a top wall 18*l* and a bottom wall 20*l* both extending generally horizontally above and below the left screen 14*l*, and a connection wall 22*l* extending mostly vertically on the inner side of the left screen 14*l*. Similarly, in addition to the right upright 16, the right frame 12*r* preferably includes a top wall 18*r* and a bottom wall 20*r* both extending generally horizontally above and below the right screen 14*r*, and a connection wall 22*r* extending mostly vertically on the inner side of the right screen 14*r*. The preferred headache rack 10 is bilaterally symmetrical, so the left frame 12*l* and the left screen 14*l* are each mirror versions of the right frame 12*r* and the right screen 14*r*. If desired, the top walls 18*l*, 18*r* and/or the bottom walls 20*l*, 20*r* may have a slight slope to horizontal to match the overall profile of the pickup truck cab for which the headache rack 10 will be used.

Unlike tubular headache racks, each of the left upright 16*l* and the right upright 16*r* are formed from sheet metal, providing a sheet metal sidewall 24 of the headache rack 10. The sheet metal material is as thick as needed for the strength requirements of the particular material chosen, which could be aluminum, an aluminum alloy or steel. The most preferred sheet metal chosen is 3 mm thick 5052 aluminum. The uprights 16*l*, 16*r* extend upward from corresponding left and right base plates 26*l*, 26*r*. In the preferred embodiment, the base plates 26*l*, 26*r* are thicker than the sheet metal chosen for the uprights 16, 16*r*, such as of 6 mm thick 5052 aluminum.

Forming the uprights 16*l*, 16*r* from sheet metal provides several important benefits. Sheet metal can be less expensive than tubular or metal bar materials. More significantly, forming the uprights 16*l*, 16*r* of sheet metal allows the uprights 16*l*, 16*r* to have a very different shape than prior art uprights. One very beneficial aspect of the sheet metal shape is the opportunity to, with simple manufacturing steps and at relatively low cost, cut, stamp or otherwise define the forward edge of the sheet metal in a curved shape, and thereby curve the forward edge 28 of the uprights 16*l*, 16*r*. The forward edge 28 of the uprights 16*l*, 16*r* is immediately behind the cab. As pickup truck designs have modernized, the rear window of many pickup trucks is no longer planar and entirely vertical, but rather may be curved and/or may extend forwardly and upwardly at a slant. The uprights 16*l*, 16*r* formed of sheet metal have a forward edge 28 which can more closely follow the profile of the pickup truck cab than the straight, vertical uprights of prior art headache racks. In the preferred embodiments, the forward edge 28 is designed to provide a constant spacing relative to the cab of the pickup truck for which the headache rack 10 will be used. For instance, in the embodiment depicted, the curvature is concave toward the cab, with a constant radius of curvature of about 1⅔ m. The forward projection of the forward edge 28 (due to not being vertical) positions the top front 30 of the headache rack 10 a little over 2 inches further forward than the bottom front of the headache rack 10. That is, the forward edge 28 provides a forwardly directed cantilever, such that a top front edge 30 of the headache rack 10 is further forward than any portion of the left base 26*l* and further forward than any portion of the right base 26*r*. Workers skilled in the art will appreciate that the sheet metal uprights 16*l*, 16*r* of the present invention can be easily modified for a forward edge curvature and/or forwardly directed cantilever to match or work best with whatever shape of OEM cab rear window is on the market. The appropriately curved shape provides better and more consistent protection for cab rear windows than prior art headache racks.

A second beneficial aspect of the sheet metal shape is that the bottom of the sidewall 24 is not constrained to the same fore-aft length as the top of the sidewall 24. The bottoms of the sidewall 24 are welded or similarly rigidly joined to the base plates 26*l*, 26*r* throughout or at multiple positions along the fore-aft length. The length of the base 26*l*, 26*r* provides a better force transfer to and from the sidewalls of the pickup truck bed to the uprights 16*l*, 16*r*, making it less likely for damage or deformation to occur either to the headache rack 10 or the pickup truck bed side wall when the headache rack 10 withstands a blow (such as when impacted by cargo). The base plates 26*l*, 26*r* in the preferred embodiment are about 10 inches long as shown in side view of FIGS. 7 and 8 compared to the top of the sidewall 24 being less than 3 inches wide in the fore-aft direction.

A third beneficial aspect of the sheet metal shape is that rigidity and strength can be achieved by bending and providing different faces to the sheet metal. In the preferred embodiment, as shown in the blank 32 of FIG. 10, a single sheet metal form is stamped and bent to provide not only the sidewall 24, but also the top wall 18 of the right and left frames 12*l*/*r*, 12*l*. The sheet metal sidewall 24 of each of the left upright 16*l* and the right upright 16*r* thus has a folded upper edge 34 defining a linear top edge of the upright 16. The top edges 34 of the uprights 16*l*, 16*r* define the upper width of the headache rack 10, which preferably substantially matches the upper width of the pickup truck cab the headache rack 10 is designed to protect. The top wall 18 and the sidewall 24 further include rear tabs 36 which are bent and then welded or otherwise rigidly joined along a top corner seam 38. The top wall 18 also can include a front tab 40. The bending of the edges 30, 34 and tabs 36, 40 provide significant strength to keep the sheet metal from buckling or bending during use. The folded edge between the rear tab 36 and the sidewall 24 in particular defines the rearward edge 42 of the sidewall 24, which, due to the fold, is linear. The linear rearward edge 42 of each of the left upright 16*l* and the right upright 16*r* slopes upwardly and forwardly from the bottom to the top, such that, in side view such as FIGS. 7 and 8, the base of each sidewall 24 is significantly wider than the top of the sidewall 24. For instance, in the preferred embodiment the linear rearward edge 42 is angled at an angle α about 26° from vertical in side view, called out in FIG. 8. At the same time, the linear rearward edge 42 of each of the left upright 16 and the right upright 16 slopes upwardly and inwardly from the base to the top, such that, in rear view such as FIG. 4, the headache rack 10 is significantly wider than the top of the headache rack 10, i.e., the base plates 26*l*, 26*r* are significantly wider apart than the top edges 34. This angle preferably matches the shape of the cab of the vehicle for which the headache rack 10 is intended when viewed from behind. For instance, in the preferred embodiment the linear rearward edge 42 is at an angle β of about 23° from vertical in rear view as called out in FIG. 4, such that the headache rack shown has a width of about 64 inches at its bottom but only about 48 inches at its top.

The top 18 of the frame 12 can include openings 44. These openings 44 are positioned, sized and shaped to receive yet further accessories for mounting on the top of the headache rack 10, such as for mounting lights (not shown) such as fog lights or other decorative lighting to the top of the headache rack 10.

As noted above and best shown in FIGS. 1 and 9, the base plates 26*l*, 26*r* can be positioned in the bottom of the uprights 16*l*, 16*r*, extending generally horizontally over the sidewall of the pickup truck bed. Each base plate 26*l*, 26*r* may include openings 46 for attachment down into the sidewall of the pickup truck bed. For instance, the openings 46 are preferably configured for use with the stake pocket anchors taught in U.S. patent application Ser. No. 15/338, 193, incorporated by reference. Each base plate 26*l*, 26*r* is preferably formed of thicker and/or stronger material than the sheet metal of the uprights 16*l*, 16*r*, such as 6 mm thick 5052 aluminum, welded to the upright 16. While different materials can be used, forming the blanks 32 of the same material as the base plates 26*l*, 26*r* allows for easier joining such as through welding, without different coefficients of thermal expansion as the headache rack 10 cycles through temperature changes in the weather. As an alternative to using a thicker material, the base plate could be formed as an additional tab (not shown) from the same piece of sheet metal as the upright blank 32 shown in FIG. 10.

While the left and right screens 14*l*, 14*r* could attach directly to the center frame 12*c*, the preferred embodiment includes the bottom wall 20 and the connection wall 22 separately from the screens 14*l*, 14*r*. The connection wall 22 preferably includes bolt hole openings 48 (best shown in FIGS. 9 and 11) for subsequent assembly to the center frame 12*c* portion with fasteners 50 such as bolts and nuts (best shown in FIGS. 2 and 6).

Like the uprights 16*l*, 16*r* each with its attached top wall 18*l*, 18*r* formed as a single blank 32, the bottom wall 20 and connection wall 22 are preferably provided together from a blank 52 of sheet metal material, such as 3 mm thick 5052 aluminum. If desired, the two blanks 32, 52 could be alternatively provided as a single blank, or could be alternatively provided as three or more blanks welded together, with the number of blanks used decided primarily based on the source of sheet material stock and manufacturing capabilities for forming and bending the blanks as well as welding or other joining capabilities. The blank 52 in this case is primarily arranged to provide a continuous rear face 54 to the inner and lower edges of the left and right frames 12*l*, 12*r*, with the bottom wall 20 and the connection wall 22 being formed as tabs off the continuous rear face portion of the blank. The connection wall 22 preferably has a front edge 56 which is curved to match the forward edge 28 of the uprights 16*l*, 16*r*.

While the screen 14 could be formed of a fabric material, it is more preferably formed of a rigid material so as to better protect the rear window of the cab. Further, while a rigid polymer or plastic material such as polycarbonate or PMMA could be used so the screen 14 is transparent or translucent, more preferably the screen 14 is formed of a metal material for strength and protection considerations. The screen 14 includes openings 58 which permit at least some viewing through the rear window of the cab and through the screen 14. In selecting the openings 58, there is a tradeoff between how much the screen 14 obstructs viewing versus the protection provided by the screen. In the preferred embodiment, the openings 58 are numerous, identically sized octagons (each about 1½ inches wide and ¾ inches tall) arranged in an aesthetically pleasing pattern. Any other shapes and layouts of openings could alternatively be used without a significant difference in functionality. The screen portions 14*l*, 14*c*, 14*r* are preferably stamped from sheet metal, such as the same type of sheet metal used to form the frame 12. In the preferred embodiment, the screen portions 14*l*, 14*c*, 14*r* are formed from the same thickness material as the frame 12, namely, 3 mm thick 5052 aluminum, which again leads to easier joining and more consistent thermal cycling.

If desired, the screen 14 can be entirely planar. More preferably, the left and right screens 14*l*, 14*r* define a concavity which to some degree matches the concavity or curvature of the forward edge 28. For example, the left and right screens 14*l*, 14*r* could be curved to identically match the forward edge 28. However, the preferred manufacturing method involves spot welding the left and right screens 14*l*, 14*r* to the tabs 36 and continuous rear face 54 of the corresponding frames 12*l*, 12*r*, and such spot welding is easier to achieve in planar segments. The left and right screens 14*l*, 14*r* in the preferred embodiment each include two planar segments, separated by a horizontal fold line 60 angled toward the concave curvature of the forward edge 28. In this configuration, the bottom planar segment of each of the left and right screens 14*l*, 14*r* is nearly entirely vertical, with the top planar segment of each of the left and right screens 14*l*, 14*r* being sloped upwardly and forwardly (in the preferred embodiment, at an angle γ called out in FIG. 15 of about 26° from vertical) to match the slope of the folded rearward edge 42. After connecting such as by welding, the left and right screens 14*l*, 14*r* thus also provide a significant strengthening function in connecting the upright/top wall 16/18 to the bottom wall/connection wall 20/22 in each of the left and right frames 12*l*, 12*r*.

The preferred center frame 12*c* is a weldment made of three pieces, one center support piece formed from a blank 62 that provides the top wall 18*c* and two connection walls 64, and then two cross beam walls 66, 68. The two cross beam walls 66, 68 may each be formed of sheet metal, each with a rear lip 70, 72 bent to provide strength similar to tabs 36 of the blanks 32, 52, 62. The rear lip 70 on the bottom cross beam wall 66 preferably bends up, while the rear lip 72 on the upper cross beam wall 68 preferably bends down, thereby defining a receiving area around the center screen 14*c* when inserted from the front. The two connection walls 64 each have bolt openings 74 corresponding to the layout, size and locations of the bolt hole openings 48, for user assembly using nuts and bolts 50.

An upper opening, defined above the upper cross beam wall 68 and below the top wall 18*c*, provides a framed central window 76. The framed central window 76 is for a brake light on the particular pickup truck for which this embodiment is used, and is accordingly not covered by the screen 14*c*. To provide additional protection for the brake light, the framed central window 76 can be longer in the fore-aft direction than the top of the sidewalls 24. For instance, in the preferred embodiment the framed central window 70 has a fore-aft length at its top of over 5 inches, in comparison to the roughly 3 inch wide top of the sidewall 24.

In contrast to the left and right frame portions 12*l*, 12*r*, the center frame 12*c* is preferably not permanently attached to its screen 14*c*. The center screen 14*c* is removably positioned in the space defined between the two connection walls 64 and the two cross beam walls 66, 68. In the preferred embodiment, the center screen 14*c* is removably attached with four of the eight bolts 50 used to attached the left, center and right frames 12*l*, 12*c*, 12*r* together. The allows the user to readily attach or detach the center screen 14*c* without complete disassembly of the frame 12.

The weldments of the left frame/screen 12*l*/14*l*, the center frame 12*c*, and the right frame/screen 12*r*/14*r* are packaged in a single box, to be attached together by the user. Because these sections are separable and fastenable together during assembly, the headache rack 10 can be shipped in a box which is dimensionally easier to handle than boxes for prior art headache racks. For instance, the width, length and height dimensions of the box can each be less than 50% of the width of the assembled headache rack 10. In the preferred shipping method, the left frame/screen weldment 12*l*/14*l* and the right frame/screen weldment 12*r*/14*r* are packaged end to end in the shipping box, with the width, length and height dimensions of the box each being less than 80% of a width of the assembled headache rack 10. The preferred box for the embodiment detailed herein has exterior dimensions of about 37×31×14 inches (945×781×344 mm).

Although the present invention has been described with reference to preferred embodiments, workers skilled in the art will recognize that changes may be made in form and detail without departing from the spirit and scope of the invention.

The invention claimed is:

1. A headache rack for protecting a rear window of a cab of a pickup truck, comprising:
   a left upright having a left base configured for attachment to a driver side wall of a bed of a pickup truck, and when attached places the left base in contact with the driver side wall of the bed of the pickup truck;
   a right upright having a right base configured for attachment to a passenger side wall of a bed of a pickup truck, and when attached places the right base in contact with the passenger side wall of the bed of the pickup truck; and
   a screen attached between the left upright and the right upright, the screen permitting at least some viewing through the rear window of the cab and through the screen, the screen protecting the rear window of the cab;
   wherein each of the left upright and the right upright are formed from sheet metal providing a sheet metal sidewall of the headache rack in contact with the respective side wall of the bed of the pickup truck when the headache rack is attached to the pickup truck, the sheet metal sidewall having a forward edge which has a concave curvature facing the cab.

2. The headache rack of claim 1, wherein the sheet metal sidewall of each of the left upright and the right upright has a folded upper edge that provides a linear top edge of the upright.

3. The headache rack of claim 1, wherein the screen is formed of sheet metal with a plurality of holes formed therein to permit viewing therethrough, and wherein the screen comprises a fold line angled toward the concave curvature of the forward edge.

4. The headache rack of claim 1, comprising a framed central window for a brake light, the frame central window not covered by the screen.

5. A headache rack for protecting a rear window of a cab of a pickup truck, comprising:
   a left upright having a left base configured for attachment to a driver side wall of a bed of a pickup truck;
   a right upright having a right base configured for attachment to a passenger side wall of a bed of a pickup truck; and
   a screen attached between the left upright and the right upright, the screen permitting at least some viewing through the rear window of the cab and through the screen, the screen protecting the rear window of the cab;
   wherein each of the left upright and the right upright are formed from sheet metal providing a sheet metal sidewall of the headache rack, the sheet metal sidewall having a forward edge which has a concave curvature facing the cab;
   wherein the sheet metal sidewall provided by each of the left upright and the right upright has a folded edge that provides a linear rearward edge.

6. The headache rack of claim 5, wherein the linear rearward edge of each of the left upright and the right upright slopes inwardly and forwardly from the base to a top, such that, in side view, the base of each upright is wider than the top of the upright.

7. A headache rack for protecting a rear window of a cab of a pickup truck, comprising:
   a left upright having a left base configured for attachment to a driver side wall of a bed of a pickup truck;
   a right upright having a right base configured for attachment to a passenger side wall of a bed of a pickup truck; and
   a screen attached between the left upright and the right upright, the screen permitting at least some viewing through the rear window of the cab and through the screen, the screen protecting the rear window of the cab;
   wherein each of the left upright and the right upright are formed from sheet metal providing a sheet metal sidewall of the headache rack, the sheet metal sidewall having a forward edge which has a concave curvature facing the cab;
   wherein the forward edge provides a forwardly directed cantilever, such that a top front edge of the headache rack is further forward than any portion of the left base and further forward than any portion of the right base.

8. A headache rack for protecting a rear window of a cab of a pickup truck, comprising:
   a left upright having a left base configured for attachment to a driver side wall of a bed of a pickup truck;
   a right upright having a right base configured for attachment to a passenger side wall of a bed of a pickup truck; and a screen attached between the left upright and the right upright, the screen permitting at least some viewing through the rear window of the cab and through the screen, the screen protecting the rear window of the cab;

wherein each of the left upright and the right upright are formed from sheet metal providing a sheet metal sidewall of the headache rack, the sheet metal sidewall having a forward edge which has a concave curvature facing the cab;

wherein the screen comprises a left screen portion, a central screen portion and a right screen portion, with each of the left screen portion, the central screen portion and the right screen portion being separable and being fastenable together during assembly, such that the headache rack can be shipped in a box with width, length and height dimensions each less than 80% of a width of the assembled headache rack.

9. The headache rack of claim 8, wherein the left screen portion and the left upright are rigidly and permanently joined together, and wherein the right screen portion and the right upright are rigidly and permanently joined together.

10. The headache rack of claim 9, further comprising a central framing section, the central framing section and the central screen portion being separable and being fastenable together during assembly, such that the headache rack can be used by assembling the left screen portion/left upright to the central framing section and by assembling the right screen portion/right upright to the central framing section, either with or without the central screen portion assembled to the central framing section.

11. A headache rack for protecting a rear window of a cab of a pickup truck, comprising:
a left upright having a left base configured for attachment to a driver side wall of a bed of a pickup truck;
a left screen portion rigidly and permanently joined to the left upright, the left screen portion permitting at least some viewing through the rear window of the cab and through the left screen portion;
a right upright having a right base configured for attachment to a passenger side wall of a bed of a pickup truck;
a right screen portion rigidly and permanently joined to the right upright, the right screen portion permitting at least some viewing through the rear window of the cab and through the right screen portion; and
a central framing section which is separable from and fastenable to each of the left screen portion/left upright and the right screen portion/right upright, such that the headache rack can be used by assembling the left screen portion/left upright to the central framing section and by assembling the right screen portion/right upright to the central framing section.

12. The headache rack of claim 11, wherein the left upright is formed of folded sheet metal, and wherein the right upright is formed of folded sheet metal, with each of the left upright and the right upright having a folded edge that provides a linear rearward edge that slopes inwardly and forwardly from the base to a top, such that, in side view, the base of each upright is wider than the top of the upright.

13. The headache rack of claim 12, wherein the sheet metal sidewall of each of the right upright and the left upright has a folded upper edge that provides a linear top edge of the upright.

14. The headache rack of claim 11, wherein the left screen portion and the right screen portion are each formed of sheet metal with a plurality of holes formed therein to permit viewing therethrough, and wherein the screen portion comprises a fold line concave forward toward the cab.

15. The headache rack of claim 11, further comprising a central screen portion which is separable from and fastenable to the central framing section, such that the headache rack can be used either with or without the central screen portion assembled to the central framing section, and wherein the central framing section defines a framed central window for a brake light, the frame central window not covered by the central screen portion.

16. A headache rack for protecting a rear window of a cab of a pickup truck, comprising:
a framing portion formed of sheet metal, the framing portion comprising:
a left upright extending upward from a left base configured for attachment to a driver side wall of a bed of a pickup truck to a left top portion;
a right upright extending upward from a right base configured for attachment to a passenger side wall of a bed of a pickup truck to a right top portion; and
a top extending from the left top portion of the left upright to the right top portion of the right upright;
wherein the left base is longer in a fore-aft direction than the left top portion and the right base is longer in the fore-aft direction than the right top portion;
wherein the sheet metal sidewall provided by each of the left upright and the right upright provide a sheet metal sidewall with a folded linear rearward edge extending at an inward and forward angle to vertical.

17. The headache rack of claim 16, further comprising:
a rigid screen attached between the left upright and the right upright, the screen permitting at least some viewing through the rear window of the cab and through the screen, the screen protecting the rear window of the cab.

* * * * *